Jan. 17, 1950 T. P. KINN 2,495,170
MICROWAVE HEATING OF DIELECTRIC MATERIALS
Filed Oct. 4, 1946

WITNESSES:
Leon M. Garman
F. E. Browder

INVENTOR
Theodore P. Kinn.
BY
F. W. Lyle
ATTORNEY

Patented Jan. 17, 1950

2,495,170

UNITED STATES PATENT OFFICE 2,495,170

MICROWAVE HEATING OF DIELECTRIC MATERIALS

Theodore P. Kinn, Baltimore, Md., assignor to Westinghouse Electric Corporation, East Pittsburgh, Pa., a corporation of Pennsylvania Application October 4, 1946, Serial No. 701,307

12 Claims. (Cl. 219—47)

This invention relates to high frequency heating, particularly high frequency heating wherein microwave energy is used for heat treating material, such as rubber and the like. It is an object to provide an improved method and apparatus for heating rubber articles and the like with microwave energy.

A more specific object is to provide an improved method and apparatus for heat treating articles, such as automobile tires and the like, with microwave energy.

It is a still further object to provide an improved method and apparatus for uniformly heat treating articles, such as automobile tires and the like, with high frequency microwave energy.

These and other objects are effected by my invention as will be apparent from the following description and claims taken in accordance with the accompanying drawing, forming a part of this application, in which:

Figures 1, 2, 3:
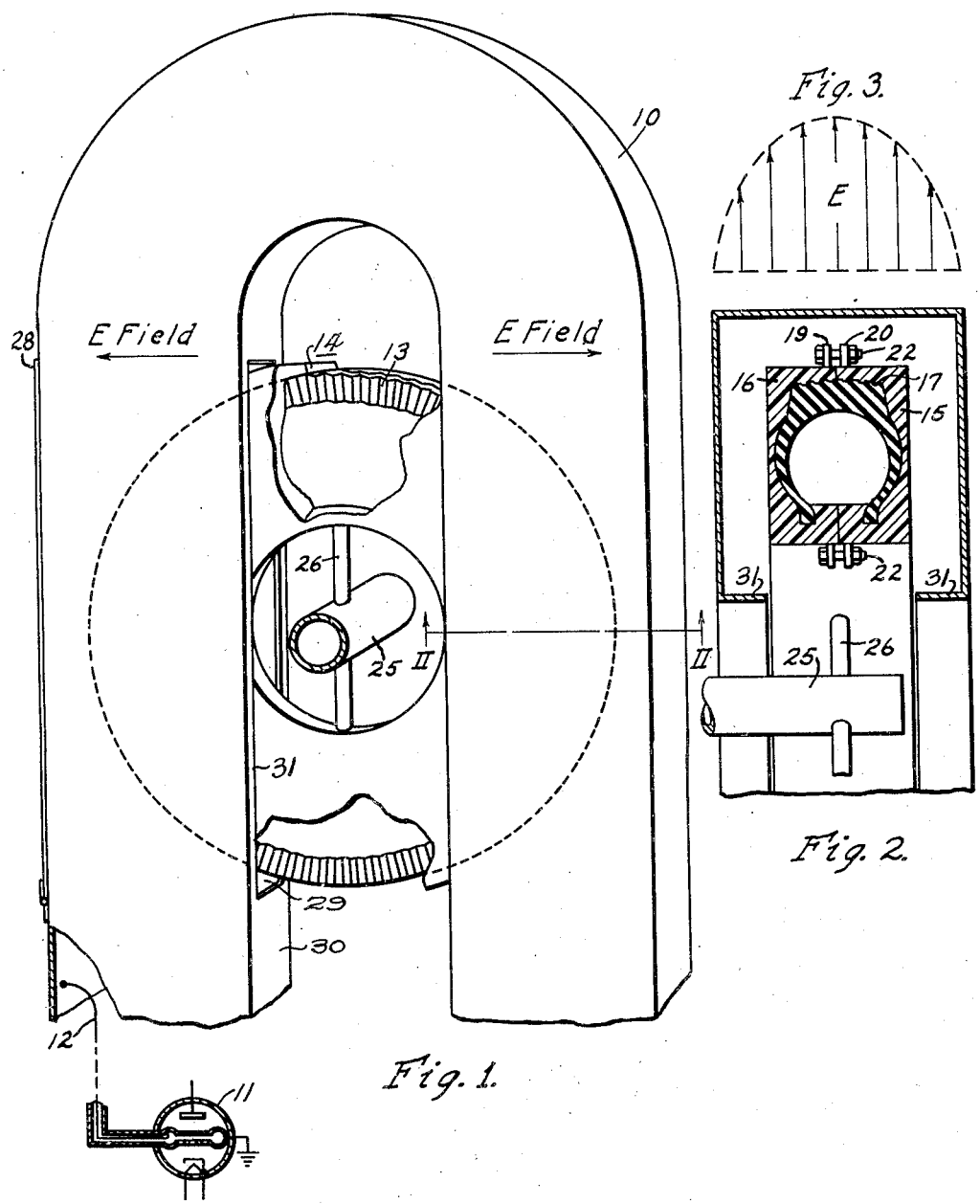
Fig. 1 is a side elevation, with parts broken away for clarity of illustration, of the apparatus employed by my invention to heat treat an automobile tire with high frequency microwave energy.
Fig. 2 is a section taken on line II—II of Fig. 1.
Fig. 3 illustrates the direction of the electric field inside the heating chamber transversely thereof and perpendicular to the tire.

Referring to Fig. 1 in detail, I show a U-shaped chamber or wave guide 10 which is excited with high frequency microwave energy by a high power microwave generator 11. The microwave generator 11 may be of any suitable type, such as is known in the art by the trade names of Klystron or Magnetron, or any other satisfactory generator of the microwave energy. The energy from the microwave generator 11 is connected into the wave guide 10 by some suitable means, such as a loop 12.

For the purpose of illustrating the utility and method of operation of my invention, I have shown an automobile tire 13 being heat treated with microwave energy in the wave guide 10. The tire 13 is held in a two-piece annular member or mold 14 comprising members 15 and 16. This mold 14 has a tread pattern 17 provided therein. Flanges 19 and 20, which are held together by bolts 22, hold the two parts 15 and 16 in assembled relationship around the tire 13. The mold is constructed of some dielectric material having a dielectric constant such that heating is almost entirely in the tire 13.

The tire 13 is built up by assembling alternate strips of rubber and fabric or by any other method that is used in the automobile tire industry. A pipe shaft 25 is provided substantially centrally of the mold, and branches 26 extend from the pipe 25 into the inside of the tire 13, fitting holes in the mold-parts 15 and 16.

A door 28 is provided in one side of the wave guide to permit insertion of the mold 14 and the tire 13 incased therein into the wave guide for heat treatment. The wave guide 10 has openings 29 in the facing sides 30 of its legs, the openings being of less width than the wave guide and providing flanges 31 in the sides 30.

In the operation of my invention the microwave generator 11 excites the wave guide 10 so that the electric field is in the direction indicated by the E arrows in Figs. 1 and 3. The tire 13 is built up, as previously described, from alternate layers or strips of rubber and fabric. The tire 13 is then placed in the two halves 15 and 16 of the mold, and the mold is clamped onto the tire by tightening the bolts 22. The mold enclosing the tire 13 is then inserted through the door 28 into the wave guide. Then the pipe 25 is placed into position, and the branch pipes 26 are connected. Then steam is supplied from some suitable source (not shown) to the pipe 25. This steam passes through the branch pipe 26 into the inside of the tire and forces the outside of the tire into the tread pattern 17 that is formed into the mold. Then the tire is rotated inside of the wave guide 10 and is heated by the microwave energy as it is rotated. Standing waves can be established longitudinally inside the wave guide 10 when the wave guide is excited by the microwave generator 11; and as the tire is rotated inside the wave guide, each point on the tire successively passes through maximum and minimum points of these standing waves. In this manner each point on the tire is uniformly heated as it is rotated in the wave guide 10. Because of the dielectric constant of the material from which the mold 17 is formed, most of the energy is utilized in heating the tire 13.

From the foregoing description taken in connection with the drawing, it is seen that I have provided an improved method and apparatus for uniformly heat treating articles, such as rubber automobile tires, with high frequency microwave energy.

While I have shown my invention in only one form, it will be obvious to those skilled in the art that it is not so limited, but is susceptible of various changes and modifications without departing from the spirit thereof, and I desire,

I claim as my invention:

1. A method of heating a discrete piece of dielectric material with microwave energy, which comprises placing a part of the material only inside a chamber excitable with microwave energy, electrically exciting said chamber to provide an electric field in said chamber having maximum and minimum voltage points, and rotating the material to move different parts of the material successively through said maximum and minimum points of said field.

2. A method of heating a discrete piece of dielectric material with microwave energy, which comprises placing a part of the material only inside a chamber excitable with microwave energy, electrically exciting said chamber to provide an electric field in said chamber having maximum and minimum voltage points, and rotating the material to move different parts of the material successively and repeatedly through said maximum and minimum points of said field with all parts of the material so moving so that all of the material is subjected to said field.

3. In apparatus for heat treating articles made of dielectric material, a wave guide, a microwave generator, means for connecting said microwave generator to said wave guide for energizing said wave guide so as to provide standing waves in said wave guide, and support means for supporting the dielectric material for rotation with movement in said wave guide in planes along which standing waves are provided in said wave guide, whereby the dielectric material passes through successive maximum and minimum points of the standing waves that exist on the inside of said wave guide.

4. In apparatus for heat treating rubber automobile tires and the like, a U-shaped wave guide having legs, a generator of microwave energy, means connecting microwave energy from said generator into said wave guide, a mold enclosing the tire or the like that is being heated, said mold being constructed of a material having a dielectric constant such that heating is almost entirely in the tire or the like, and support means comprising a shaft for rotating said mold inside said wave guide with parts of the mold passing successively from one of said legs to the other.

5. Apparatus for heat-treating articles such as automobile tires, comprising, in combination, a U-shaped wave guide having legs, said legs having openings in their facing sides adapted to receive parts of the article, a mold encasing the article for heat-treatment, and support means supporting the mold centrally in said wave guide, and comprising a shaft so arranged with respect to said legs that the mold passes through said openings.

6. Apparatus for heat-treating a hollow article such as automobile tires, comprising, in combination, a U-shaped wave guide having legs, said legs having openings in their facing sides adapted to receive parts of the article, a mold for encasing the article for heat-treatment, support means for the mold and comprising a shaft so arranged with respect to said legs that the mold passes through said openings, and pipe means leading to said mold for applying gas under pressure to the inside of the article.

7. Apparatus for heat-treating comprising a U-shaped envelope having legs, said envelope being constructed and arranged to provide a hollow wave guide, said legs having openings in their facing sides adapted to receive dielectric material to be heat-treated, the openings being narrower than the sides containing them, and support means for a mold and comprising a shaft centrally between said openings for rotating the mold with parts of the mold successively passing through said openings.

8. An invention including that of claim 7, but characterized further by one of said legs having a door in a side opposite to an opening in one of said legs, through which the mold may be passed.

9. Apparatus for heat-treating annular dielectric articles, comprising, in combination, a microwave chamber means having a pair of legs, said legs having openings in their facing sides adapted to receive parts of an annular dielectric article, the distance between said openings being less than the diameter of said article, support means for supporting the article, said support means comprising a shaft between said legs so arranged with respect to said legs that parts of the article pass through said openings.

10. An invention including that of claim 9 but further characterized by said chamber means having a door through which the article can be placed in said chamber.

11. Apparatus for heat-treating dielectric material comprising, in combination, a microwave chamber means having a pair of legs, said legs having openings in their facing sides, rotatable means adapted to receive dielectric material, said rotatable means comprising an annular member adapted to receive the material, and support means supporting the annular member centrally between said legs in a common plane thereof, said support means comprising a shaft for rotating said annular member, whereby the annular member carries the material successively through said legs.

12. An invention including that of claim 11 but further characterized by said chamber having longitudinal flanges in their facing sides, said flanges bounding longitudinal edges for said openings.

THEODORE P. KINN.

REFERENCES CITED

The following references are of record in the file of this patent:

UNITED STATES PATENTS

| Number | Name | Date |
| --- | --- | --- |
| 2,261,847 | Dufour et al. | Nov. 4, 1941 |
| 2,341,617 | Hull | Feb. 15, 1944 |
| 2,364,526 | Hansell | Dec. 5, 1944 |
| 2,370,161 | Hansen | Feb. 27, 1945 |
| 2,427,094 | Evans | Sept. 9, 1947 |

OTHER REFERENCES

Skilling, "Physical Behavior of Wave Guides," Electronics, March, 1943, pages 76–80.

"Electronic Heat," Steel, November 12, 1945, page 92.